March 12, 1935.  A. D. MACLACHLAN  1,994,139
RUBBER COVERED METAL TUBING
Filed May 26, 1932
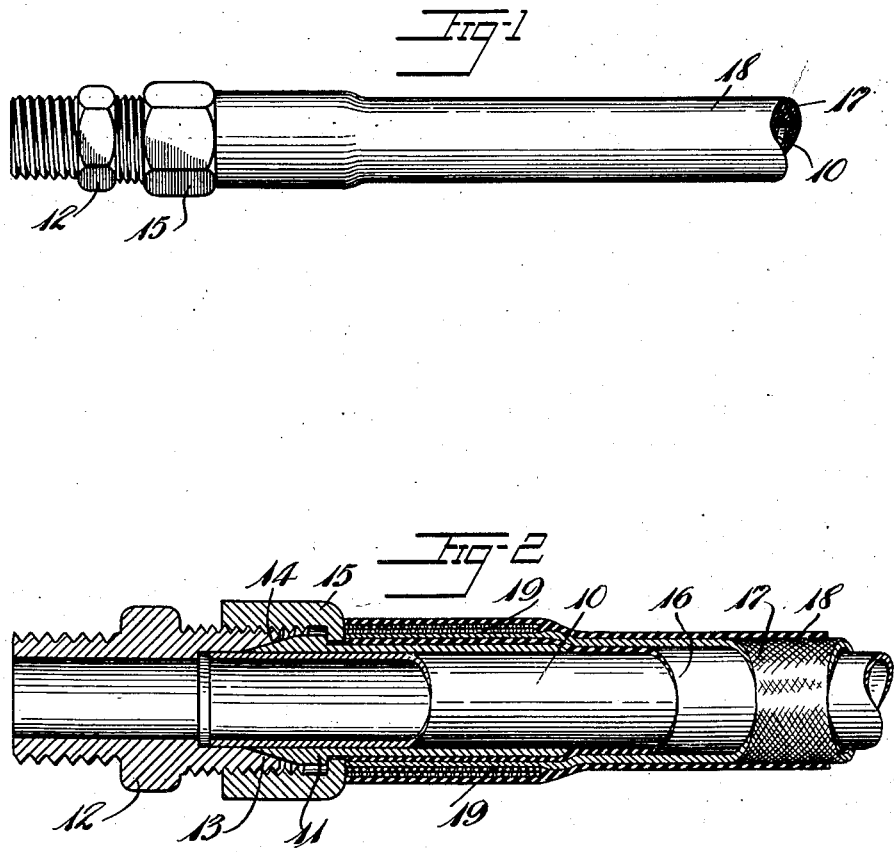
Inventor
Andrew D. Maclachlan
By Eakin & Avery
Attys.

Patented Mar. 12, 1935

1,994,139

UNITED STATES PATENT OFFICE 1,994,139

RUBBER COVERED METAL TUBING

Andrew D. Maclachlan, Akron, Ohio, assignor to The B. F. Goodrich Company, New York, N. Y., a corporation of New York Application May 26, 1932, Serial No. 613,704

3 Claims. (Cl. 137—75)

This invention relates to rubber covered metal tubing such as is used for fuel and oil lines on aircraft, automobiles and the like.

The principal objects of the invention are to provide security, strength and simplicity in construction.

Other objects will appear from the following description and the accompanying drawing.

In the drawing:

Fig. 1 is a side elevation of a section of covered tubing with a union nipple attached thereto.

Fig. 2 is a similar view partly in section to show the construction thereof.

Referring to the drawing, the numeral 10 designates a thin walled metal tube having a coupling sleeve 11 attached thereto as by soldering or brazing. The end of tube 10 is inserted in a union nipple 12 which has a tapered throat 13 adapted to engage a conical surface 14 on the coupling sleeve 11. A union nut 15 engages a shoulder on the sleeve 11 and is threaded to the nipple 12 for the purpose of drawing the nipple and coupling sleeve into intimate engagement.

In order to protect the metal tubing 10 from destructive vibration and to insure against the loss of fluid in case of failure thereof, tubing 10 has applied thereto throughout its extent between coupling members, a layer of rubber 16 which may be adhesively attached to the tube. Over this rubber layer a pressure resisting layer of textile material 17 such as one or more layers of rubber impregnated fabric is applied and an outer protective cover of rubber 18 extends thereover.

To additionally reinforce the ends of the covering so as to prevent the escape of any fluid which may have escaped through failure of the tubing 10, and to provide additional cushioning against vibration adjacent the couplings where the thickness of metal is suddenly reduced, without substantially increasing the weight of the pipe, a wrapping of cords or cord fabric 19 is applied over the end of the reinforcing fabric 17 adjacent the coupling, before the rubber protective cover is applied. The wrapping 19 is applied with considerable tension. The assembled covering is then subjected to vulcanizing conditions and vulcanized as desired.

The cord wrapping 19 may consist of a narrow width of rubber impregnated or coated cord fabric having the cords laid circumferentially of the tubing and applied in a plurality of convolutions. Being applied under tension the wrapping 19 compresses or compacts the underlying portion of rubber layer 16 and fabric 17 as indicated in the drawing and prevents escape of any fluid which might escape from the tube 10 and flow along the outside of the tube toward the open end of the covering.

By enclosing the wrapping 19 within the protective cover 18 it is protected from abrasion or contact with solvents which might otherwise cause loosening and failure of the wrapping.

The provision of the coupling sleeve 11 not only affords adequate sealing means at the ends of the light-walled tubing but provides sufficient strength against collapse of the tubing directly beneath the tensioned wrapping.

The construction is particularly light in weight and therefore especially useful in aircraft where security against leakage of fuel and lubricating fluids is of extreme importance and reduction of weight is a necessity.

I claim:

1. The combination with a seamless thin-walled metallic fluid conducting pipe having a coupling member, said pipe and metallic coupling constituting an independent fluid-tight conduit, of a vibration-absorbent leak-proof covering therefor, said covering comprising a laminated rubber and fabric sheath terminating adjacent the coupling and having between its laminations a reinforcing wrapping of circumferentially tensioned cords adjacent its end and integral therewith, said wrapping being applied only within said covering and being adapted to permit uncoupling of the pipe without disturbing said covering.

2. The combination with a seamless thin-walled metallic fluid-conducting pipe having a coupling member, said pipe and metallic coupling constituting an independent fluid-tight conduit, of a vibration-absorbent leak-proof covering therefor, said covering comprising a rubber tube enclosing said pipe, a reinforcing fabric layer extending thereover, a tensioned wrapping of cords applied over said fabric layer adjacent the end of the covering, and a rubber protective cover extending over said wrapping and fabric layer, all elements of the covering being vulcanized to form an integral sheath, said sheath being adapted to permit uncoupling of the pipe without disturbing said sheath.

3. A seamless thin-walled metallic fluid-conducting pipe, a metal sleeve extending over the end of the pipe and provided with means for engaging a coupling, said pipe constituting an independent fluid-tight conduit, and a vibration absorbent leak-proof covering extending over said pipe and sleeve, said covering comprising an impervious layer of rubber, a fabric reinforcing layer completely covering the same, a wrapping of tensioned cords extending over the portion covering said sleeve, and a rubber protective cover extending over said fabric reinforcing layer and said wrapping, all elements of the covering being vulcanized to form an integral sheath, adapted to permit uncoupling of the pipe without disturbing the covering.

ANDREW D. MACLACHLAN.

CERTIFICATE OF CORRECTION.

Patent No. 1,994,139.   March 12, 1935.

ANDREW D. MACLACHLAN.

It is hereby certified that error appears in the printed specification o the above numbered patent requiring correction as follows: Page 1, second column, lines 15-16, 28-29, and 43, claims 1, 2 and 3 respectively, for the words "seamless thin-walled" read thin-walled seamless; lines 16 and 29, claims 1 and 2 respectively, after the article "a" insert metallic; lines 1 and 30, claims 1 and 2 respectively, strike out metallic; and that the said Letters Patent should be read with these corrections therein that the same m conform to the record of the case in the Patent Office.

Signed and sealed this 8th day of December, A. D. 1936.

(Seal)

Henry Van Arsdale
Acting Commissioner of Patents.